United States Patent
Kim

(12) 
(10) Patent No.: US 6,272,972 B1
(45) Date of Patent: Aug. 14, 2001

(54) RODLESS CYLINDER ACTUATOR

(76) Inventor: Yong Rae Kim, 319-201 Woosung Apt., Sangrok-Maul, 122, Jungja-Dong, Pundang-Gu, Sungnam-Si, Kyunggi-do (KR)

( * ) Notice: Subject to any disclaimer, the term of this patent is extended or adjusted under 35 U.S.C. 154(b) by 0 days.

(21) Appl. No.: 09/384,404

(22) Filed: Aug. 27, 1999

(30) Foreign Application Priority Data

Sep. 1, 1998 (KR) .............................................. 1998-35881
Jul. 23, 1999 (KR) .............................................. 1999-30124

(51) Int. Cl.[7] ....................................................... F01B 9/00
(52) U.S. Cl. ................................................................ 92/137
(58) Field of Search ................................... 92/62, 76, 137

(56) References Cited

U.S. PATENT DOCUMENTS

| 1,696,044 | * | 12/1928 | Kuskin ................................. 92/137 X |
| 1,756,910 | * | 4/1930 | Fukker ................................. 92/137 X |
| 2,047,965 | * | 7/1936 | Huffman .................................... 92/76 |
| 2,047,981 | * | 7/1936 | Osgood ..................................... 92/76 |
| 4,437,309 | | 3/1984 | Suzuki et al. . |
| 4,545,290 | | 10/1985 | Lieberman . |
| 4,796,515 | | 1/1989 | Dry . |
| 5,333,535 | | 8/1994 | Miyamoto et al. . |

FOREIGN PATENT DOCUMENTS 56-10802 * 2/1981 (JP) .......................................... 92/137

* cited by examiner

*Primary Examiner*—John E. Ryznic

(57) ABSTRACT

A rodless cylinder actuator for moving a slide table in machine tools is disclosed. In the actuator, two pneumatic or hydraulic cylinders are parallely arranged to be directed in opposite directions. At least one pulley is rotatably mounted to the outside end of the piston rod of each cylinder using a bracket. A wire is fixed to the cover of a cylinder housing at both ends thereof and passes over the pulleys of the two piston rods. The slide table is mounted to the middle portion of the wire, thus being linearly and longitudinally reciprocable on the top surface of the cylinder housing in accordance with a movement of the piston rods relative to the two cylinders. A connection rod extends between the brackets of the two piston rods, thus maintaining a desired interval between the two brackets. The rodless cylinder actuator of this invention has a simple construction capable of reducing the production cost of such actuators. Due to such a simple construction, the actuator is rarely broken and is easily repaired. This finally reduces the repairing and maintenance cost of such actuators. The actuator also rarely causes safety hazards during an operation.

7 Claims, 15 Drawing Sheets

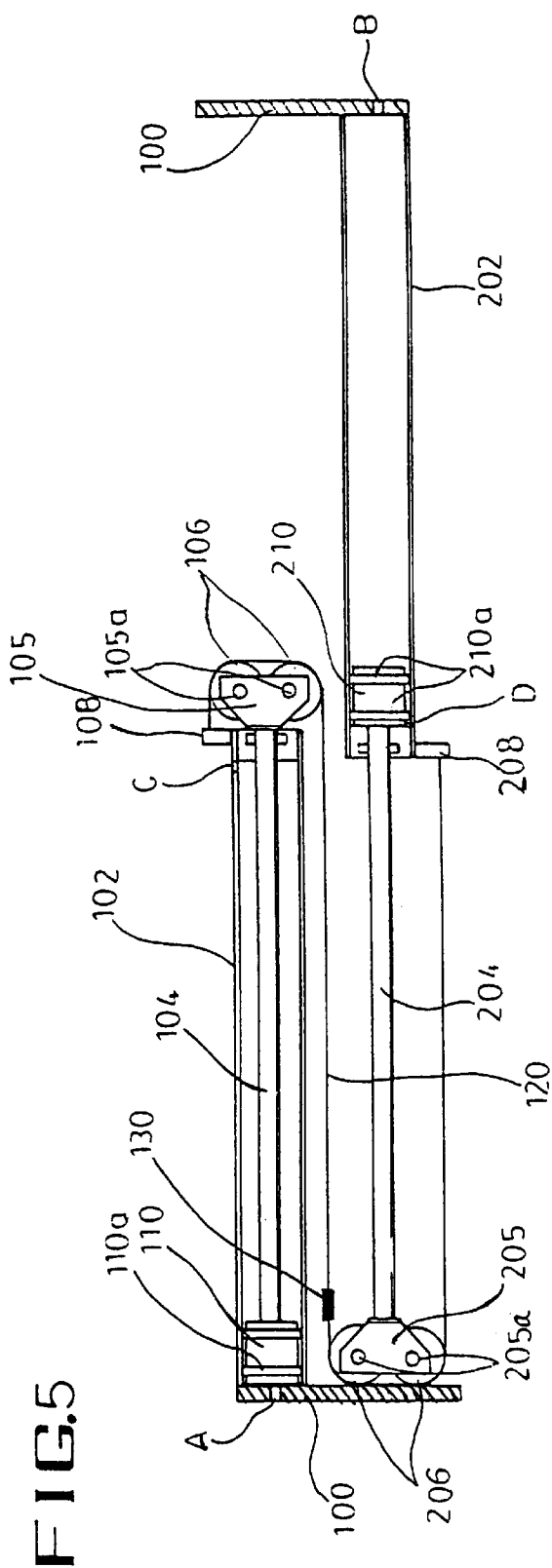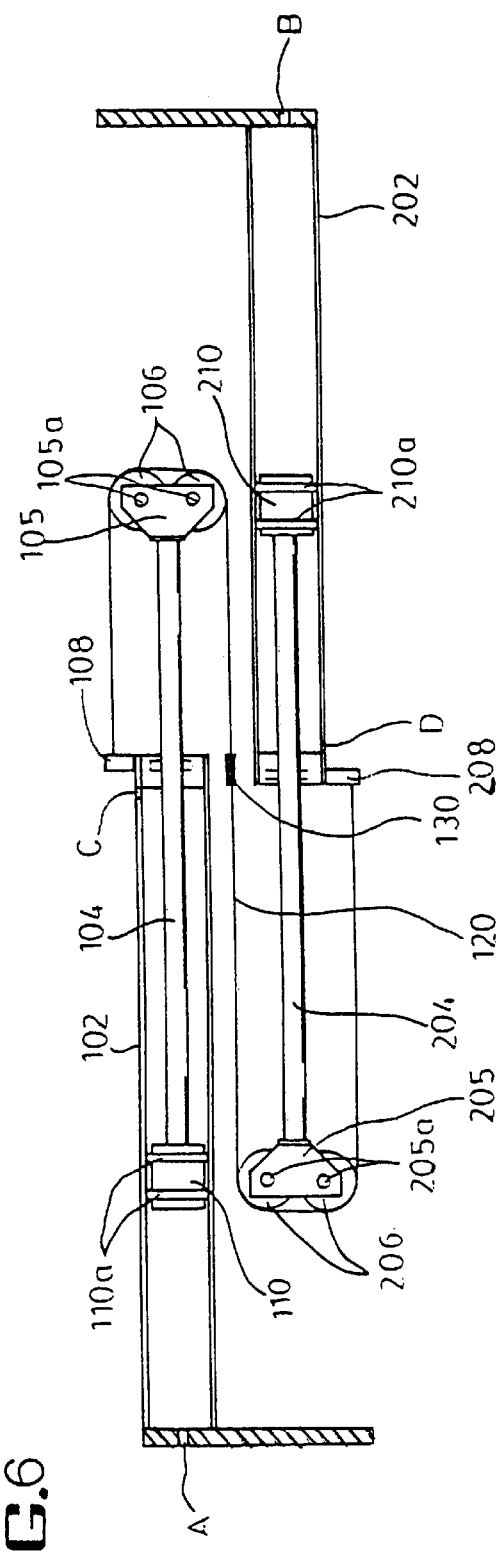

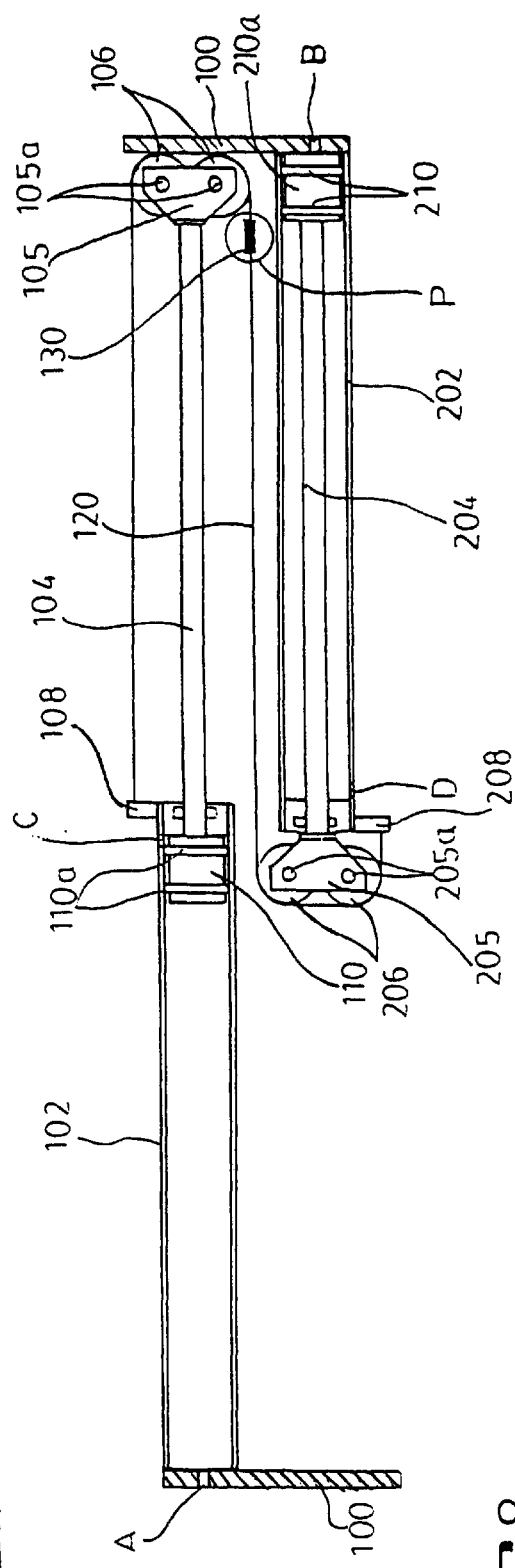
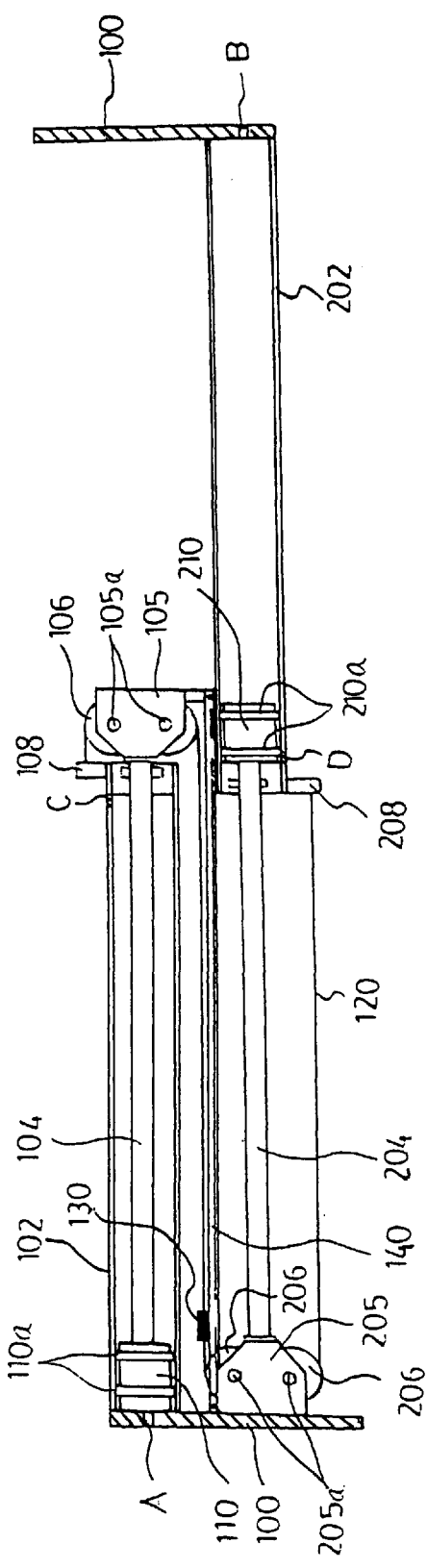
FIG. 7a
FIG. 8

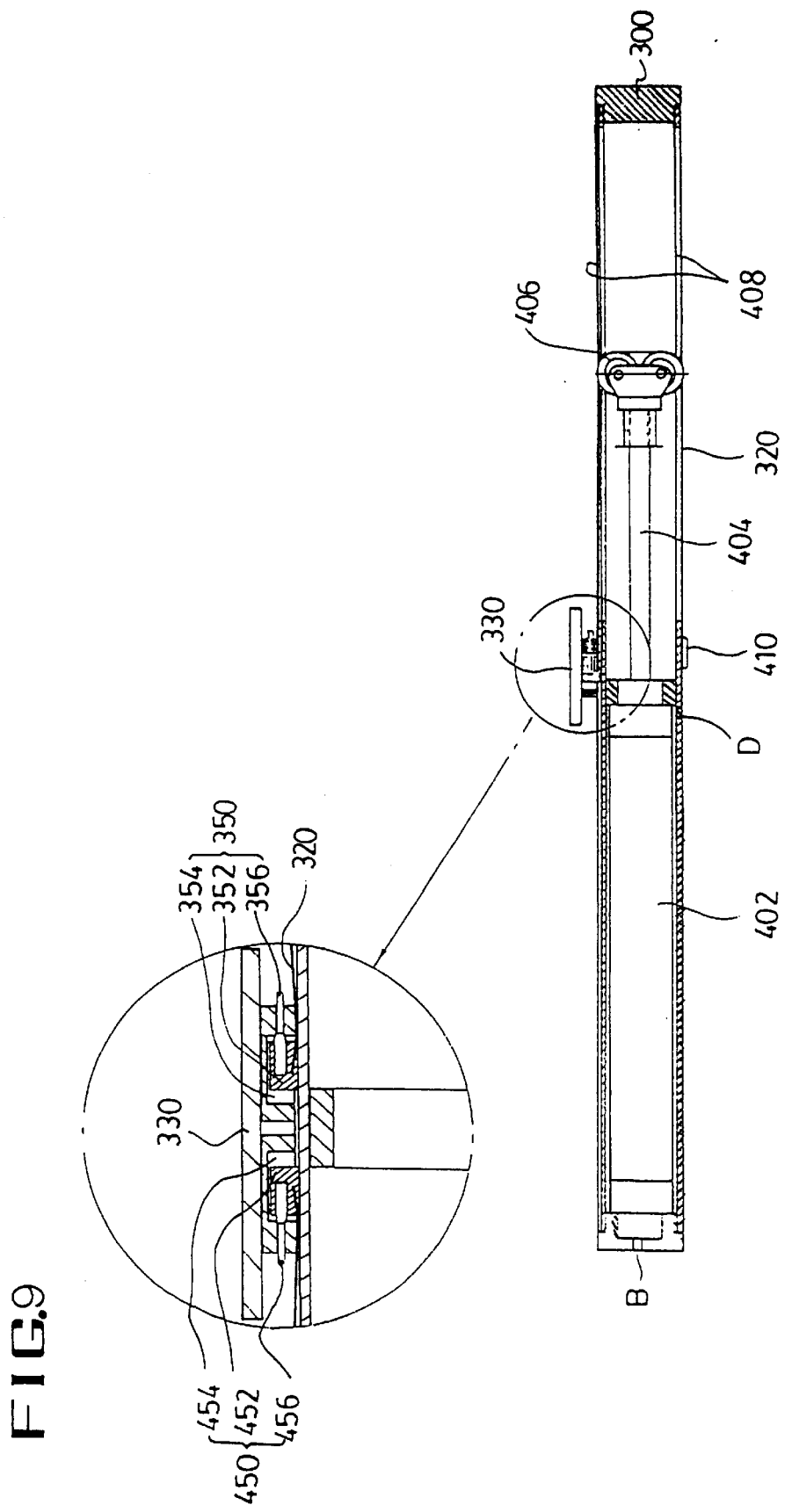

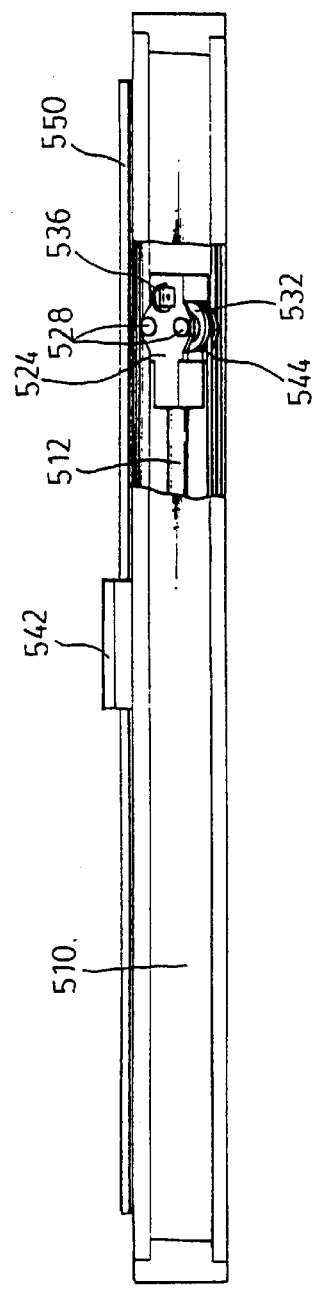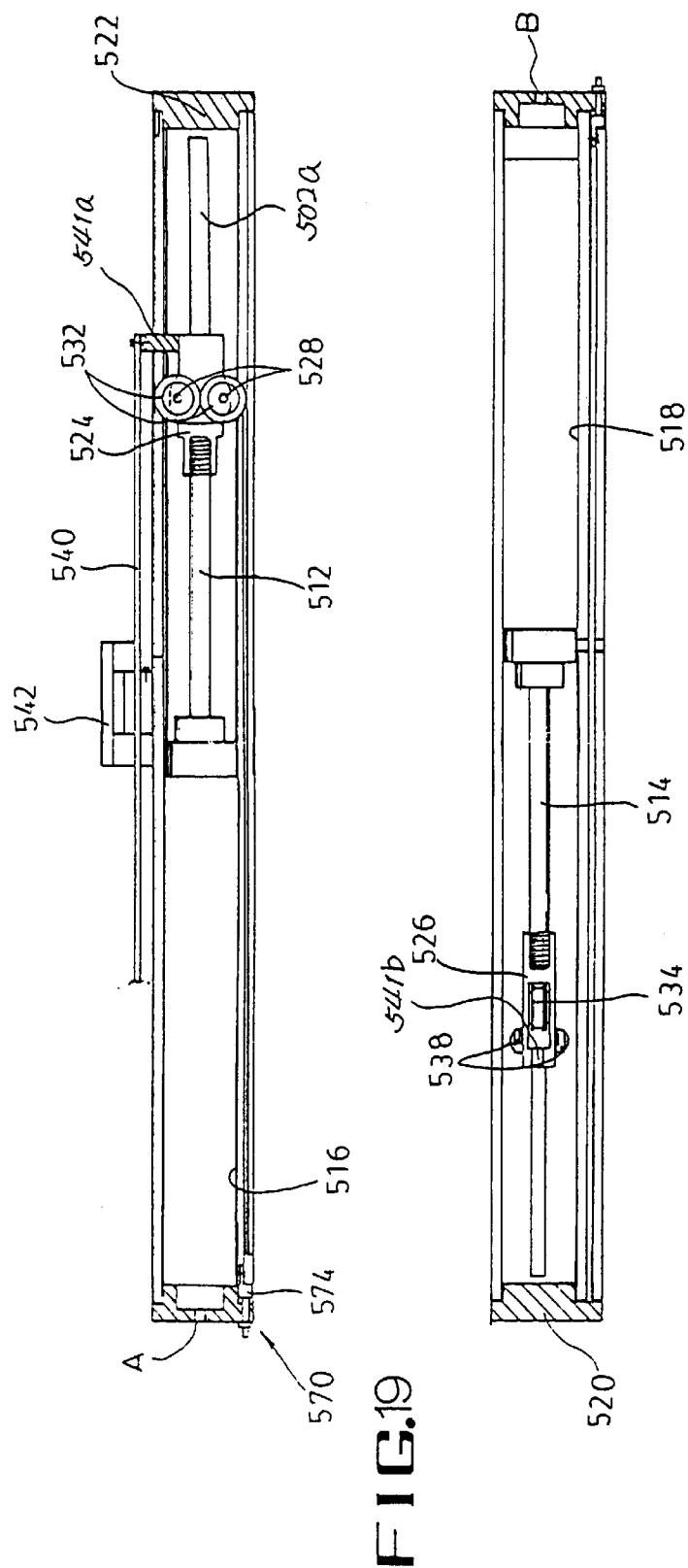
FIG.17
FIG.18
FIG.19

RODLESS CYLINDER ACTUATOR

BACKGROUND OF THE INVENTION

1. Field of the Invention

The present invention relates, in general, to rodless cylinder actuators for feeding workpieces in machining tools and, more particularly, to a rodless cylinder actuator having a piston slidably positioned within the cylinder, the piston being pnewmatically hydraulically reciprocable within the cylinder, thus reciprocating a slide table installed outside the cylinder housing.

2. Description of the Prior Art

A conventional rodless cylinder actuator for feeding workpieces in machining tools may be referred to Japanese Patent Laid-open Publication No. Sho. 62-266,206 published on Nov. 19, 1987.

FIGS. 1 to 4 show the above Japanese rodless cylinder actuator. As shown in the drawings, the actuator 1 has a slit 3 that longitudinally extends from one end to the other end on its top surface of the cylinder 1. A longitudinal bore 2 is formed within the cylinder 1 and communicates with the outside of the cylinder 1 through the slit 3. A piston 4, consisting two piston bodies 5, is slidably received within the bore 2. Each of the two piston bodies 5 has a circumferential groove 6 on its external surface, with a sealing member 7 being set in the groove 6 to be brought into close contact with the interior surface of the bore 2.

A longitudinal groove 26 is formed along each top edge of the slit 3. The width of each groove 26 is narrower than that of the slit 3. A longitudinal subsidiary sealing strip 27 is set into the grooves 26 at both side edges thereof, thus sealing the top portion of the slit 3. A movable block 11 is slidably received within the bore 2. The movable block 11 is integrated with a connection block 14 at its top section, with a guide groove 28 being formed on the top surface of the connection block 14. A guide surface 29 is formed on the bottom of the guide groove 28. The above guide surface 29 is brought into contact with the lower surface of the subsidiary sealing strip 27, thus allowing the strip 27 to escape from the grooves 26. On the other hand, two pressure plates 30 are provided at both sides of the connection body 14. The above pressure plates 30 come into contact with the top surface of the subsidiary sealing strip 27, thus pressing down the strip 27 into the grooves 26. A sealing strip 19 is positioned within the lower portion of the slit 3 while being set in a groove 16 formed in the lower portion of the slit 3. A rail 20 is longitudinally formed along the central axis of the top surface of the sealing strip 19. The above sealing strip 19 is also fitted into the lower portion of the slit 3 at the rail 20.

A cap 31, having an air hole 32, is tightened to each end of the cylinder 1. An air pipe 33 extends from the inside end of each cap 31 while communicating with the air hole 31. The above air pipe 33 is designed to be selectively inserted into a relief hole 34 formed on each piston body 5. Each end of the two sealing strips 19 and 27 is mounted to the junction between the cap 31 and a mount plate 36 using a pin 37. In such a case, the mount plate 36 is provided on the top surface of the subsidiary sealing strip 27. A slide table 38, carrying a workpiece thereon, is seated on and mounted to the connection body 14 using a plurality of pins 39.

The above rodless cylinder actuator 1 is operated as follows. When pressurized air is applied to the rear chamber 40 of the piston 4, with the front chamber 42 of the piston 4 discharging air therefrom, a pressure difference is generated between the two chambers 40 and 42. The piston 4 is thus moved forwardly within the cylinder 1. When the piston 4 moves forwardly as described above, two elastic protrusions 21 of the sealing strip 19 are elastically deformed to be removed from two protrusion rails 17 of the cylinder 1, thus allowing the sealing strip 19 to be removed from the groove 16. The strip 19 is inserted into a passage 24 at its front portion.

As both the piston 4 and the movable body 11 further move forwardly within the bore 2 of the cylinder 1, the rear piston body 5 pushes the sealing strip 19 into the groove 16, thus allowing the protrusions 21 to engage with the protrusion rails 17 while elastically deforming the protrusions 21 of the sealing strip 19.

On the other hand, when pressurized air is applied to the front chamber 42 of the piston 4, with the rear chamber 40 discharging air, a pressure difference is generated between the two chambers 40 and 42. Both the piston 4 and the movable body 11 are thus moved backwardly within the cylinder 1. In such a case, the sealing strip 19 is removed from the groove 16 and is inserted into the passage 24 at its rear end. Therefore, it is possible for both the connection body 14 and the slide table 38 to be reciprocable along the slit 3. When the piston 4 and the movable body 11 are moved within the cylinder 1, the sealing strip 19 partially closes the strip 3 at a position free from the piston bodies 5. That is, at the position free from the piston bodies 5, the elastic protrusions 21 of the strip 19 engage with the protrusion rails 17 of the cylinder 1, thus closing the strip 3 at that position. Therefore, even when the internal pressure of the front or rear chamber 42 or 40 is reduced to a low pressure, the sealing strip 19 is free from sagging into the chamber 42 or 40, but completely closes and seals the slit 3 at the position around the chamber 42 or 40. Therefore, the sealing strip 19 almost completely prevents air leakage through the slit 3.

During a reciprocating motion of the connection body 14 along the slit 3, the leading portion of the subsidiary sealing strip 27 is partially raised up at its lower surface by the leading end of the guide surface 29 of the connection body 14, thus escaping from the grooves 26 of the slit 3 prior to being laid on the guide surface 29 of the body 14. On the other hand, the trailed portion of the sealing strip 27 is pressed down at its upper surface by a trailed pressure plate 30, thus being brought into engagement with the grooves 26 of the strip 3. Therefore, the slit 3 is always sealed by the subsidiary sealing strip 27 at the front and rear of the reciprocating connection body 14. It is thus possible to almost completely prevent an introduction of foreign substances, such as dust, into the cylinder 1 through the slit 3 during a reciprocating motion of the connection body 13 along the slit 3.

In addition, when the sealing strip 19 engages with the groove 16 of the slit 3, the lower surface of the sealing strip 19 may be somewhat protruded into the bore 2 as shown in FIG. 4 due to a designing tolerance of the strip 19 and the groove 16. In such a case, the chambers 40 and 42 may fail to be completely sealed, thus causing an air leakage between them. However, such an air leakage between the chambers 40 and 42 is completely prevented by a pressure contact between the sealing member 7 of the piston 4 and a thin plate 22 of the sealing strip 19. The sealing member 7 of the piston 4 is designed to be elastically extendible or contractible, while the thin plate 22 totally covers the lower surface of the sealing strip 19 while extending outside both side edges of the strip 19. Therefore, when the lower surface of the sealing strip 19 is protruded into the bore 2 as described above, the elastic sealing member 7 compresses both side edges of the thin plate 22, thus appropriately bending and deforming both side edges of the plate 22. The sealing member 7 is thus brought into close contact with both the inner surface of the bore 2 and the thin plate 22 without leaving a gap between them. Therefore, the actuator is free from air leakage between the chambers 40 and 42.

However, the above rodless cylinder actuator has the following problems. That is, it is necessary for the actuator to have a plurality of sealing members used for preventing air leakage within the cylinders. This complicates the construction of such actuators and increases the production cost of the actuators.

It is also necessary to precisely machine the sealing members, thus resulting in a further increase in the production cost of the rodless cylinder actuator. Due to the complex construction caused by the sealing members, the actuator is apt to be broken at the sealing members. This increases the maintenance and repairing cost of the actuator and reduces the expected life span of the cylinder.

SUMMARY OF THE INVENTION

Accordingly, the present invention has been made keeping in mind the above problems occurring in the prior art, and an object of the present invention is to provide a rodless cylinder actuator having a simple construction.

Another object of the present invention is to provide a rodless cylinder actuator, designed to be rarely broken and to effectively perform its function for a lengthy period of time.

A further object of the present invention is to provide a rodless cylinder actuator, designed to be easily repaired and to be used at low repairing and maintenance cost.

Still another object of the present invention is to provide a rodless cylinder actuator, designed to be free from safety hazards during an operation.

In order to accomplish the above objects, an embodiment of the present invention provides a rodless cylinder actuator for moving slide tables, comprising: a cylinder housing; two cylinders provided within the cylinder housing; two piston rods axially and movably received in the two cylinders, respectively; at least one pulley rotatably shafted to an outside end of each of the two piston rods using a bracket; a wire consisting of two wire parts, the two wire parts being fixed to first and second wire locking members of the cylinder housing at their first ends and respectively passing over the pulleys of the two piston rods; a slide table mounted to a junction of the two wire parts and positioned outside a top wall of the cylinder housing to be movable on the top wall of the housing in accordance with a movement of the two piston rods relative to the two cylinders; and two tension control units for respectively controlling the tension of the wire when necessary, the tension control units being provided on the slide table and being respectively connected to second ends of the two wire parts.

Another embodiment of this invention provides a rodless cylinder actuator for moving slide tables, comprising: a cylinder housing having two longitudinal parallel openings, with two longitudinal slits being formed along the sidewall of the housing so as to respectively communicate with the two parallel openings; two cylinders installed within the two openings of the housing in opposite directions, with two piston rods being axially and movably positioned within the two cylinders, respectively; two covers respectively and firmly supporting the bases of the two cylinders and covering the two longitudinal openings of the housing; two brackets mounted to the outside ends of the piston rods, respectively; at least one pulley rotatably shafted to each of the two brackets; two bearings provided at both sides of each of the two brackets for preventing each piston rod from being rotated within an associated cylinder; a slide table movably seated on two guide rails longitudinally and parallely extending along both side edges on the top wall of the cylinder housing, the table thus being linearly movable on the top wall of the housing; a belt consisting of two belt parts, the two belt parts being respectively fixed to the two covers of the two cylinders at first ends thereof and being fixed to both side ends of the slide table at second ends thereof, the two belt parts also respectively passing over the pulleys of the two piston rods, thus moving the table on the top wall of the housing in accordance with a movement of the two piston rods relative to the cylinders; two tension control units respectively installed on the two covers and used for controlling the tension of the two belt parts when necessary; and a connection member extending between the two brackets of the piston rods so as to maintain a desired interval between the pulleys of the two brackets.

BRIEF DESCRIPTION OF THE DRAWINGS

The above and other objects, features and other advantages of the present invention will be more clearly understood from the following detailed description taken in conjunction with the accompanying drawings, in which:

FIG. 5 is a longitudinal-sectioned view, showing the construction of a rodless cylinder actuator in accordance with the primary embodiment of the present invention;

FIG. 6 is a view of the actuator of FIG. 5, showing the slide table positioned at a middle position on the cylinder;

FIG. 7a is a view of the actuator of FIG. 5, showing the slide table positioned at a right-end position on the cylinder;

FIG. 7b is a sectional view, showing the portion P of FIG. 7a;

FIG. 8 is a plan view, showing the construction of a rodless cylinder actuator in accordance with the second embodiment of the present invention;

FIG. 9 is a plan-sectioned view, showing the construction of a rodless cylinder actuator in accordance with the third embodiment of the present invention;

FIG. 17 is a partially broken view of an important part of the actuator according to the fourth embodiment of this invention;

FIG. 18 is a sectional view of the actuator according to the fourth embodiment taken along the line H—H of FIG. 16;

FIG. 19 is a sectional view of the actuator according to the fourth embodiment taken along the line I—I of FIG. 16.

DESCRIPTION OF THE PREFERRED EMBODIMENTS

Figure 1:
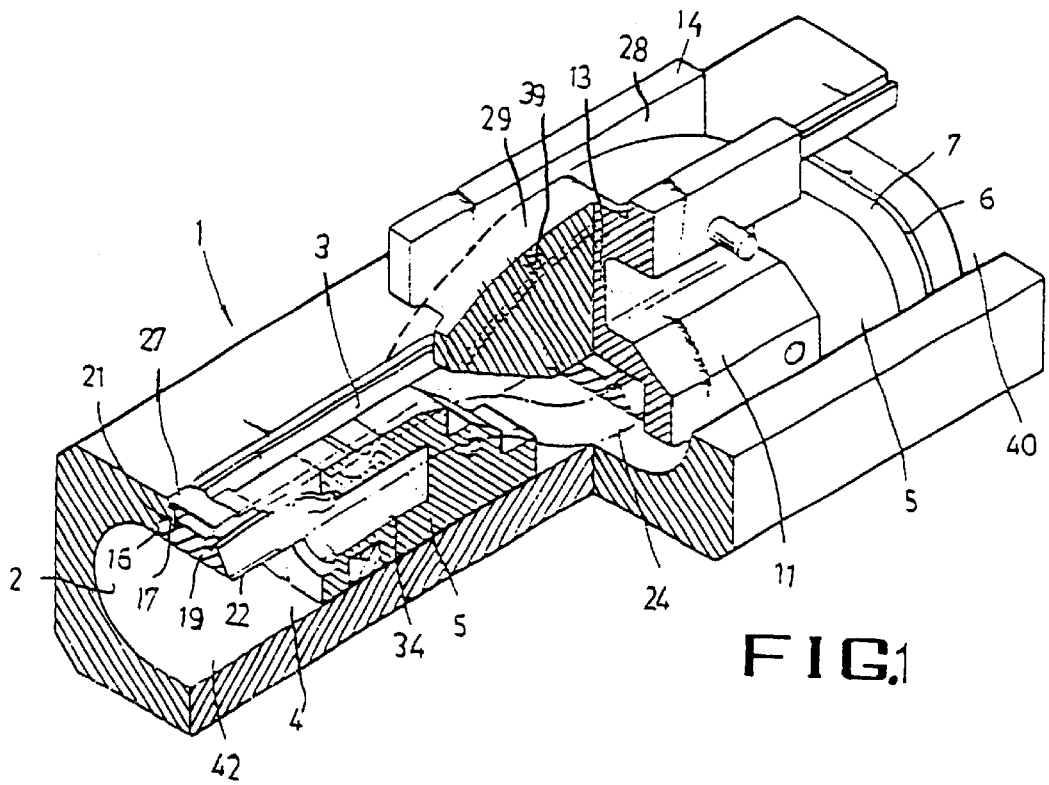
FIG. 1 is a partially broken perspective view of a conventional rodless cylinder actuator.
Figure 2:
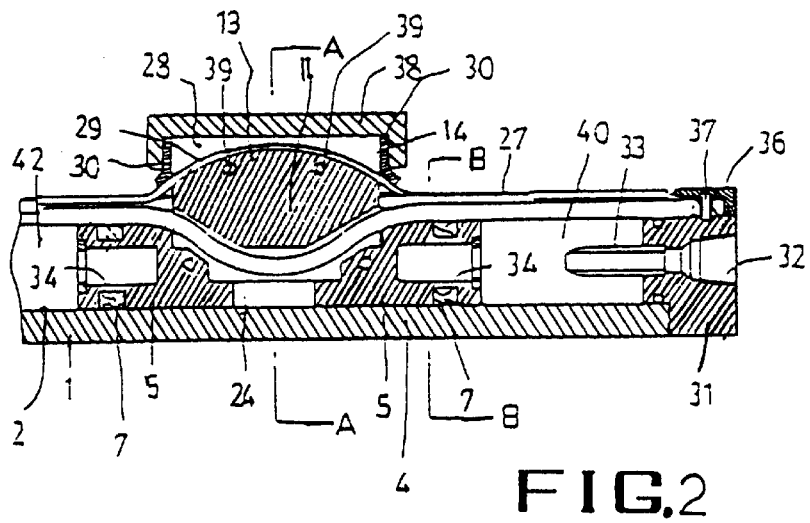
FIG. 2 is a longitudinal-sectioned view of the actuator of FIG. 1.
Figure 3:
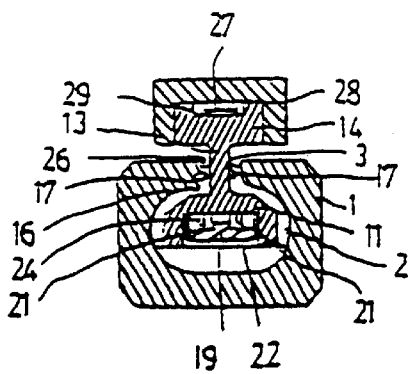
FIG. 3 is a cross-sectioned view of the above actuator taken along the line A—A of FIG. 2.
Figure 4:
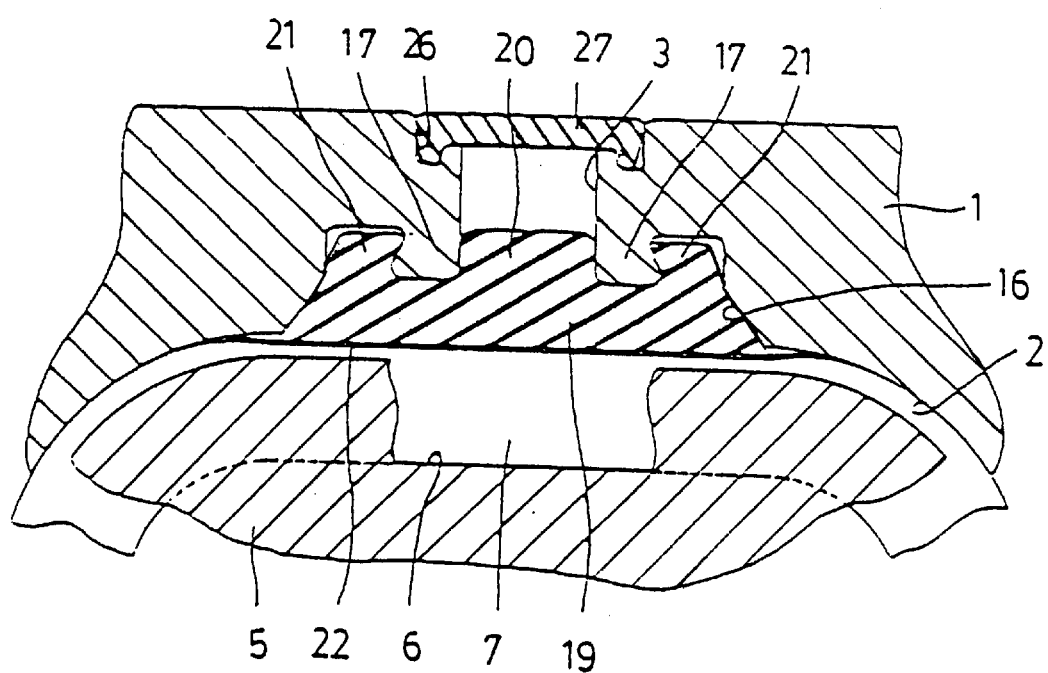
FIG. 4 is a cross-sectioned view of the above actuator taken along the line B—B of FIG. 2.

FIGS. 5 to 7b show a rodless cylinder actuator according to the primary embodiment of this invention. As shown in the drawings, the rodless cylinder actuator of the primary embodiment comprises a cylinder housing 100. Two longitudinal cylinders, or first and second cylinders 102 and 202, are parallely installed on the housing 100 in a way such that the two cylinders 102 and 202 extend from both end walls of the housing 100 in opposite directions. A piston rod 104 or 204 is axially and movably inserted into the inside end of each cylinder 102 or 202, thus being extendible and retractable relative to the cylinder 102 or 202. Mounted to the outside end of each piston 104 or 204 is a bracket 105 or 205. A pulley set, consisting of two pulleys 106 or 206, is rotatably mounted to each bracket 105 or 205 using two shafts 105a or 205a. A wire 120, consisting of two wire parts, is fixed to two locking brackets 108 and 208 of the two cylinders 102 and 202 at the first ends of the two wire parts. The two wire parts respectively extend from the two locking brackets 108 and 208 to respectively pass over the first and second pulley sets 106 and 206 prior to being fixed to two tension control units 150 and 250 of a slide table 130. The slide table 130 for workpieces is fixedly mounted to the junction between the two parts of the wire 120 at a position between the first and second pulley sets 106 and 206. The above slide table 130 is also positioned outside the top wall of the cylinder housing 100 while being horizontally and linearly slidable along the top wall of the housing 100. The two tension control units 150 and 250, set on the lower surface of the slide table 130 and connected to the two parts of the wire 120, are used for controlling the tension of the wire 120 when necessary.

In the primary embodiment, it is possible to use a conventional pneumatic or hydraulic cylinder as each of the two cylinders 102 and 202.

As shown in FIGS. 5 to 7b, each cylinder 102 or 202 is provided with a first port A or B at an associated end wall of the housing 100, and so pressurized air or pressurized oil is introduced into or discharged from the outside chamber of the cylinder 102 or 202 through the port A or B. Each cylinder 102 or 202 is also provided with a second port C or D at its inside end portion, and so atmospheric air is introduced into or discharged from the inside chamber of the cylinder 102 or 202 through the port C or D. A plurality of piston rings 110a or 210a are tightly fitted over each of the slidable pistons 110 and 210 within the cylinders 102 and 202, thus accomplishing a desired sealing effect between each cylinder 102 or 202 and an associated piston 110 or 210. The above pistons 110 and 210 are respectively connected to the inside ends of the piston rods 104 and 204 at their outside ends.

As described above, the two longitudinal cylinders 102 and 202 parallely extend from both end walls of the housing 100 in opposite directions. The piston rods 104 and 204 of the two cylinders 102 and 202 are also axially and linearly movable relative to the cylinders 102 and 202 in opposite directions. A constant interval is retained between the two parallel piston rods 104 and 204 during operation.

In addition, each of the two pulley sets 106 and 206, individually consisting of two pulleys, is rotatably mounted to the bracket 105 or 205 of an associated piston rod 104 or 204 using two shafts 105a or 205a. The two pulley sets 106 and 206 are used for guiding a movement of the wire 120.

The wire 120 is divided into two wire parts as described above. Each of the two wire parts is fixed to the fixing bracket 108 or 208 of an associated cylinder 102 or 202 at its first end. The second end of each wire part is fixed to an associated tension control unit 150 or 250 of the slide table 130, and so the tension of the two wire parts is appropriately controlled by the two units 150 and 250.

The slide table 130, installed at the junction of the two parts of the wire 120, is positioned outside the top wall of the cylinder housing 100. The above table 130 is thus horizontally and linearly slidable along the top wall of the housing 100 in accordance with an opposite directional movement of the two piston rods 104 and 204 relative to the cylinders 102 and 202.

Figure 7B:
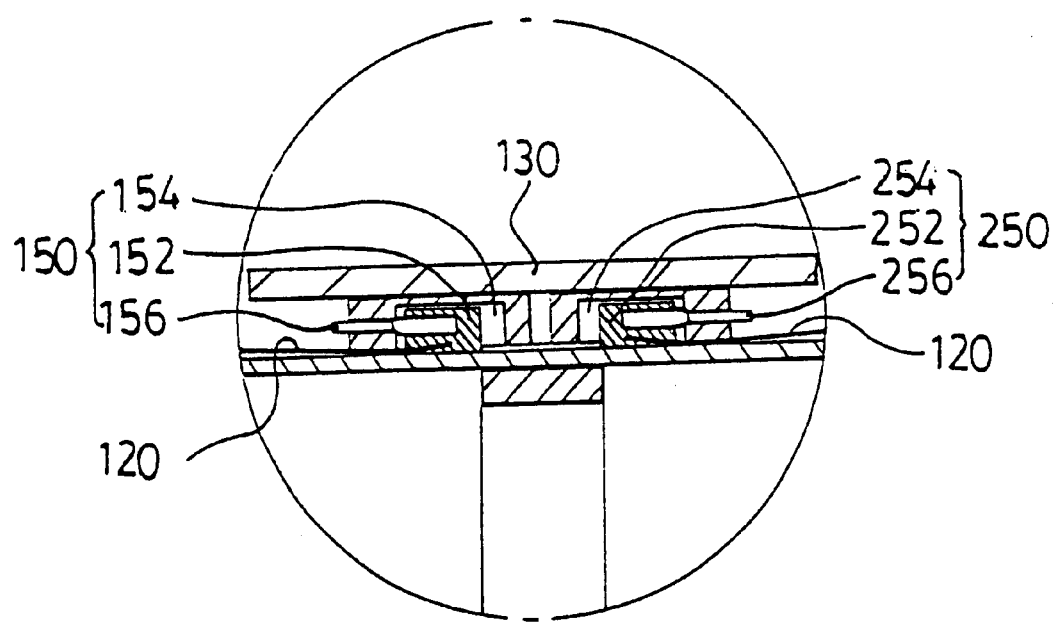

As best seen in FIG. 7b, the two tension control units 150 and 250, used for controlling the tension of the wire 120, are set in the lower portion of the slide table 130. Each of the two tension control units 150 and 250 comprises a housing provided with a recess 154 or 254. A wire locking member 152 or 252 is set in the recess 154 or 254 of each unit 150 or 250 and connects each of the two parts of the wire 120 to the unit 150 or 250. A tension control screw 156 or 256 engages with each of the two wire locking members 152 and 252, and is operated to move an associated locking member 152 or 252 in either direction, thus controlling the tension of the wire 120 when necessary.

The operational effect of the above rodless cylinder actuator will be described hereinbelow.

When the slide table 130 is positioned at the left end of the housing 100 as shown in FIG. 5, the piston rod 104 of the first cylinder 102 is fully retracted into the cylinder 102, while the piston rod 204 of the second cylinder 202 is fully extended from the cylinder 102. In such a case, the table 130 on the wire 120 is positioned at the left end of the housing 100 around the base of the first cylinder 102.

In order to move the table 130 from the left-end position to the right-end position on the housing 100, pressurized oil or pressurized air is newly introduced into the outside chamber of the first cylinder 102 through the port A, while existing pressurized oil or pressurized air is discharged from the outside chamber of the second cylinder 202 through the port B. In such a case, existing air is discharged from the inside chamber of the first cylinder 102 through the port C, while atmospheric air is newly introduced into the inside chamber of the second cylinder 202 through the port D. The piston rod 104 is extended from the first cylinder 102, and so the wire 120, fixed to the locking block 108 of the cylinder 102, is tensioned. The slide table 130 is horizontally moved along with the wire 120 to the right as shown in FIG. 6. In such a case, the piston rod 204 of the second cylinder 202 is retracted into the cylinder 202.

When the piston rod 104 is further extended from the first cylinder 102 as shown in FIG. 7a, the slide table 130 is moved to the right-end position of the housing 100, or to the base of the second cylinder 202. That is, the slide table 130 is horizontally moved on the housing 100 by a distance that is the sum of the lengths of the two cylinders 102 and 202.

When it is necessary to return the table 130 to the position of FIG. 5, pressurized oil or pressurized air is newly introduced into the outside chamber of the second cylinder 202 through the port B, while existing pressurized oil or pressurized air is discharged from the outside chamber of the first cylinder 102 through the port A. In such a case, existing air is discharged from the inside chamber of the second cylinder 202 through the port D, while atmospheric air is newly introduced into the inside chamber of the first cylinder 102 through the port C. The piston rod 204 is extended from the second cylinder 202.

Therefore, the wire 120, fixed to the locking block 208 of the cylinder 202, is tensioned. The slide table 130 is horizontally moved along with the wire 120 to the left as shown in FIGS. 6 and 5. In such a case, the piston rod 104 of the first cylinder 102 is gradually retracted into the cylinder 102 until it is fully retracted into the cylinder 102.

When the wire 120 is undesirably loosened, the tension of the wire 120 is appropriately adjusted by operating the two tension control units 150 and 250 as follows. That is, in order to adjust the tension of the loosened wire 120, the two tension control screws 156 and 256 are rotated clockwise or counterclockwise in the drawings, thus moving the wire locking members 152 and 252 to the left or right and appropriately tensioning the wire 120.

FIG. 8 is a plan view, showing the construction of a rodless cylinder actuator in accordance with the second embodiment of this invention. In the second embodiment, the general shape of the actuator remains the same as in the primary embodiment, but a connection rod 140 is added to the cylinder for preventing safety hazards during an operation of the cylinder. Those elements common to both the primary embodiment of FIGS. 5 to 7b and the second embodiment will thus carry the same reference numerals and further explanation is not deemed necessary.

In the actuator according to the second embodiment, the connection rod 140 extends between the two brackets 105 and 205, thus maintaining a desired interval between the two pulley sets 106 and 206. That is, when existing pressurized oil or air is discharged from the outside chamber of the first or second cylinder 102 or 202, the piston rod 104 or 204 is freely movable relative to the cylinder 102 or 202, and so the wire 120 may be loosened so that it may be unexpectedly removed from the pulley sets 106 and 206. In such a case, safety hazards may occur during a starting operation of the rodless cylinder actuator. However, the connection rod 140 of the second embodiment always maintains the desired interval between the two brackets 105 and 205, thereby preventing such an unexpected separation of the wire 120 from the pulley sets 106 and 206 and allowing the actuator to be free from such safety hazards.

Figure 10:
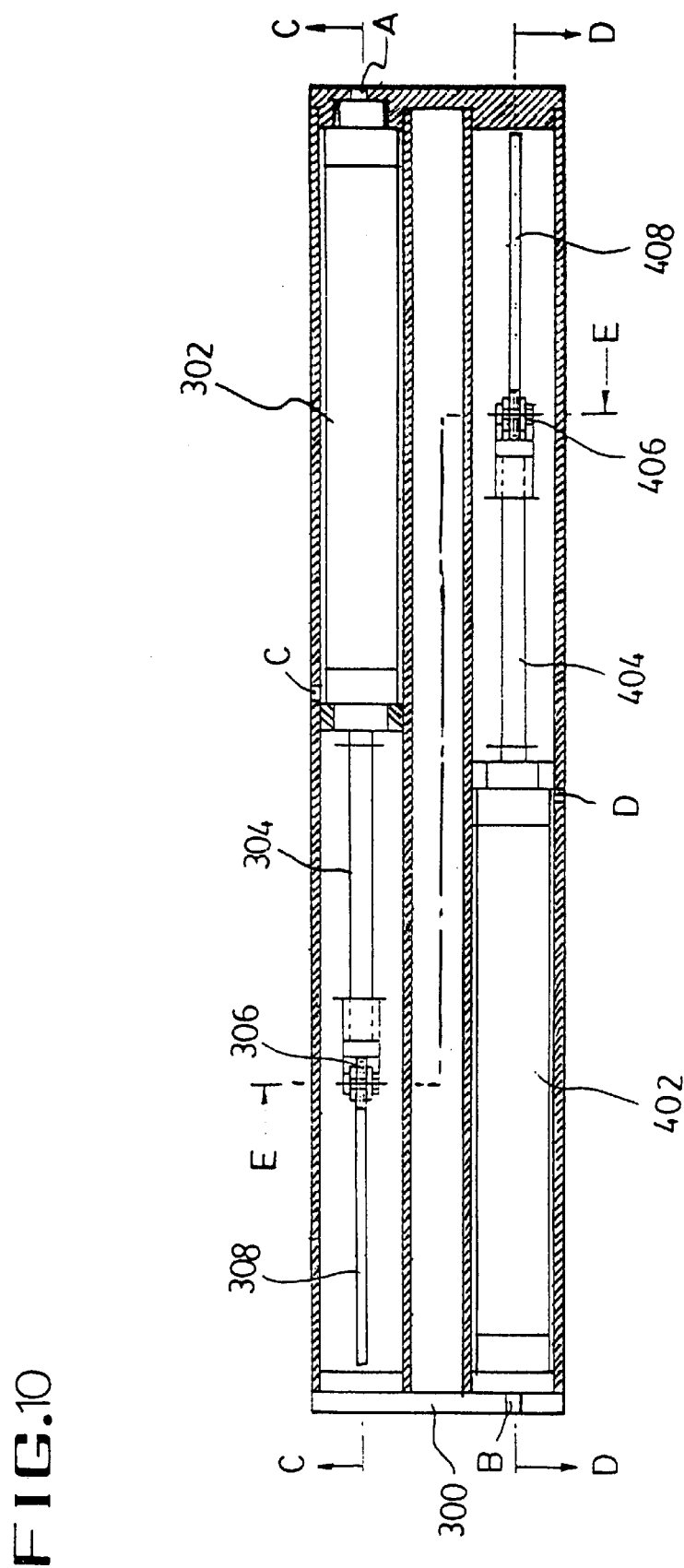
FIG. 10 is a longitudinal-sectioned view of the actuator according to the third embodiment taken along the line C—C of FIG. 9.
Figure 11:
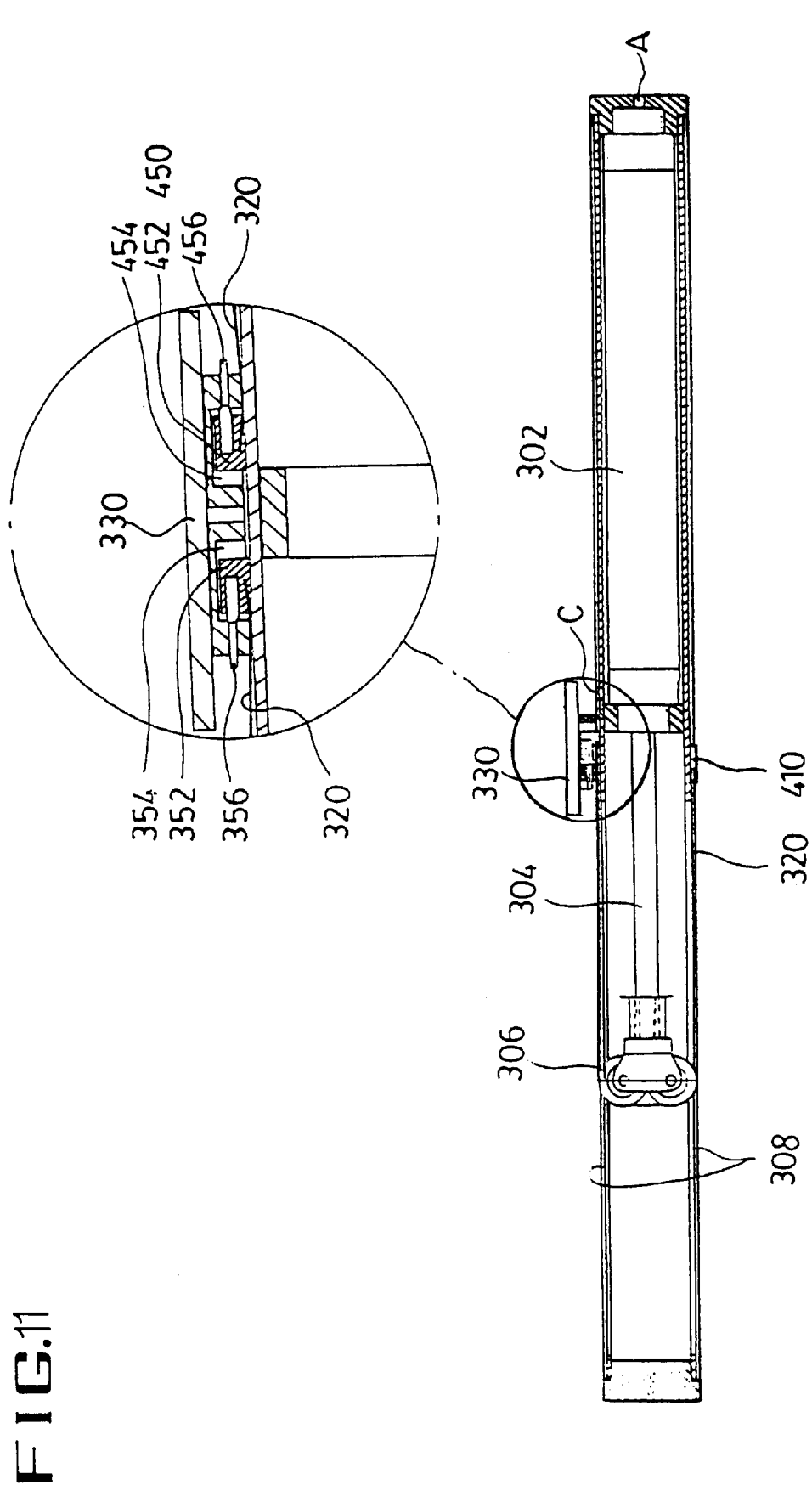
FIG. 11 is a longitudinal-sectioned view of the actuator according to the third embodiment taken along the line D—D of FIG. 9.

FIGS. 9 to 13 show a rodless cylinder actuator in accordance with the third embodiment of this invention. As shown in the drawings, the first and second cylinders 302 and 402 according to the third embodiment are integrated with the cylinder housing 300. In addition, each of the two pulley sets 306 and 406 of the first and second piston rods 304 and 404 is linearly guided by upper and lower guide slits 308 or 408 at its two pulleys, thus preventing the piston rods 304 and 404 from being undesirably rotated during an operation of the actuator. The upper and lower guide slits 308 or 408 are longitudinally formed on the top and bottom walls of the housing 300. That is, two upper guide slits 308 and 408 are longitudinally formed on the top wall of the housing 300 at positions corresponding to the traces of the two pulley sets 306 and 406, while two lower guide slits 308 and 408 are longitudinally formed on the bottom wall of the housing 100 at positions corresponding to the upper guide slits. In the same manner as that described for the primary embodiment, a wire 320, consisting of two wire parts, is fixed to two locking brackets 310 of the two cylinders 302 and 402 at the first ends of the two wire parts. The two wire parts respectively extend from the two locking brackets 310 to respectively pass over the first and second pulley sets 306 and 406 prior to being fixed to two tension control units 350 and 450 of a slide table 330 as shown in FIGS. 10 and 11. The above slide table 330 is fixedly mounted to the junction between the two parts of the wire 320 and is positioned outside the top wall of the cylinder housing 300 while being horizontally and linearly slidable along the top wall of the housing 300.

As shown in FIGS. 10 and 11, the two tension control units 350 and 450, set in the slide table 330 and connected to the two parts of the wire 320, are used for controlling the tension of the wire 320 when necessary. Each of the two tension control units 350 and 450 comprises a housing provided with a recess 354 or 454. A wire locking member 352 or 452 is set in the recess 354 or 454 of each unit 350 or 450, and connects each of the two parts of the wire 320 to the unit 350 or 450. A tension control screw 356 or 456 engages with each of the two wire locking members 352 and 452, and is operated to move the locking members 352 and 452 in either direction, thus controlling the tension of the wire 320 when necessary.

Figure 12:
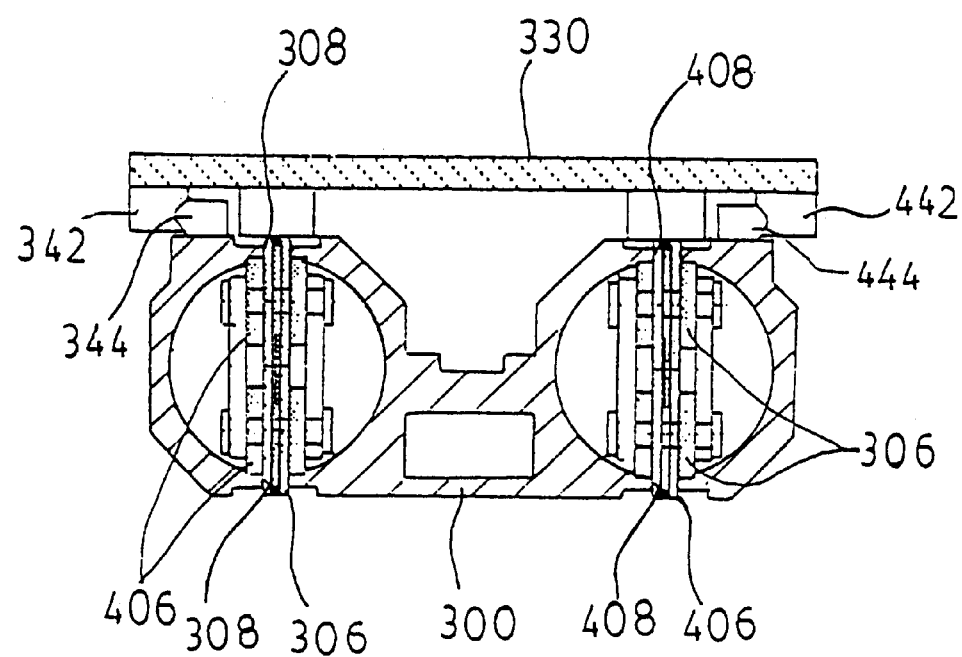
FIG. 12 is a cross-sectioned view of the actuator according to the third embodiment taken along the line E—E of FIG. 9.
Figure 13:
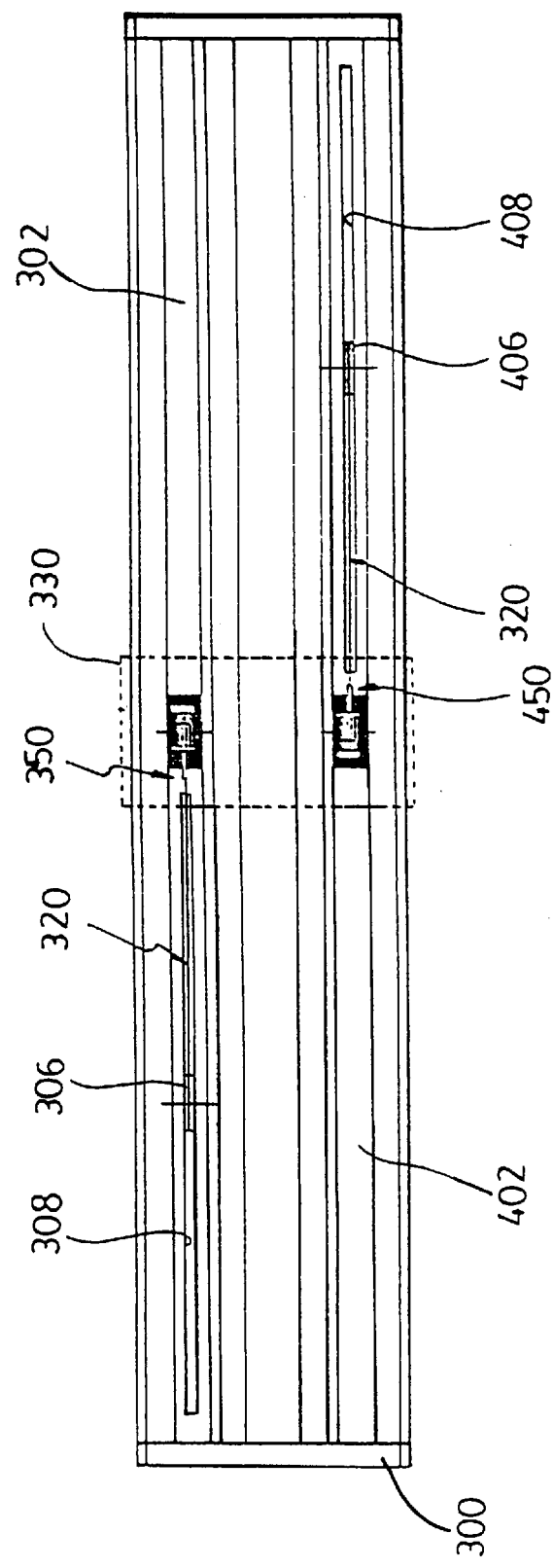
FIG. 13 is a plan view of the actuator according to the third embodiment of this invention.
Figure 14:
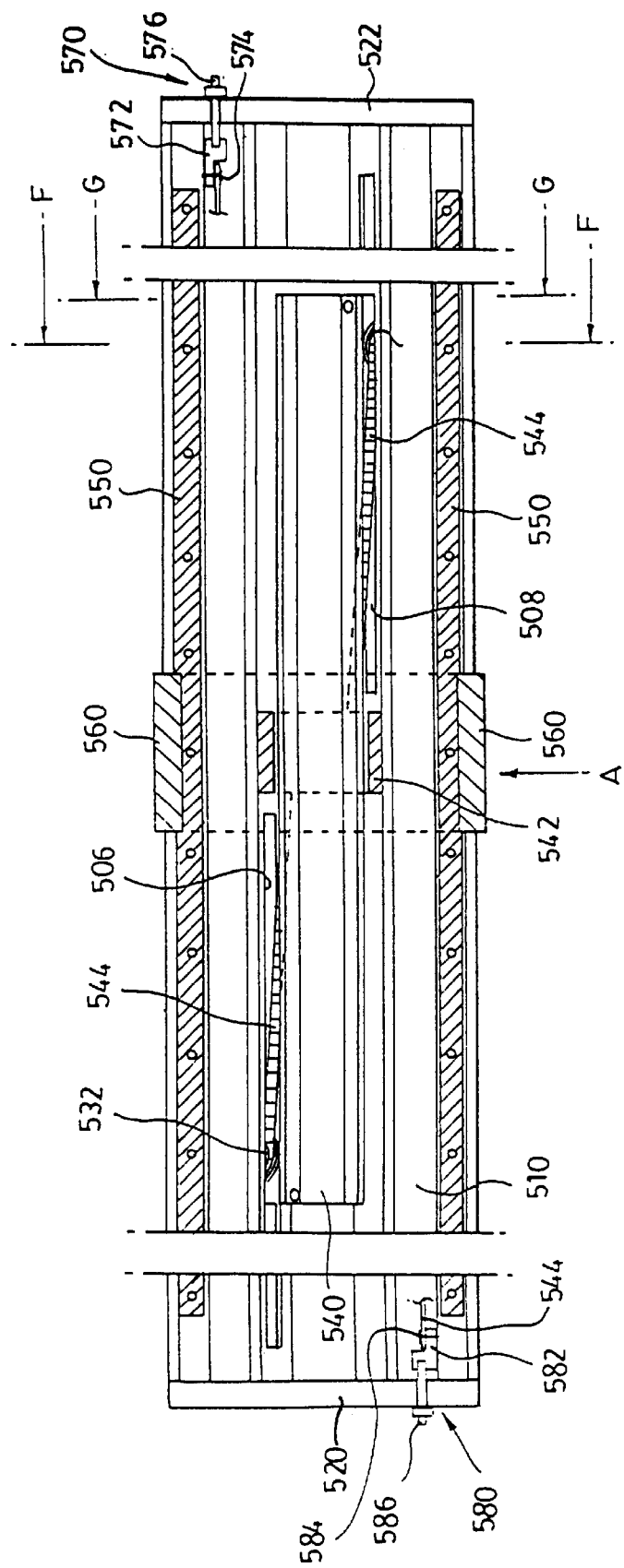
FIG. 14 is a plan-sectioned view, showing the construction of a rodless cylinder actuator in accordance with the fourth embodiment of the present invention.
Figure 15:
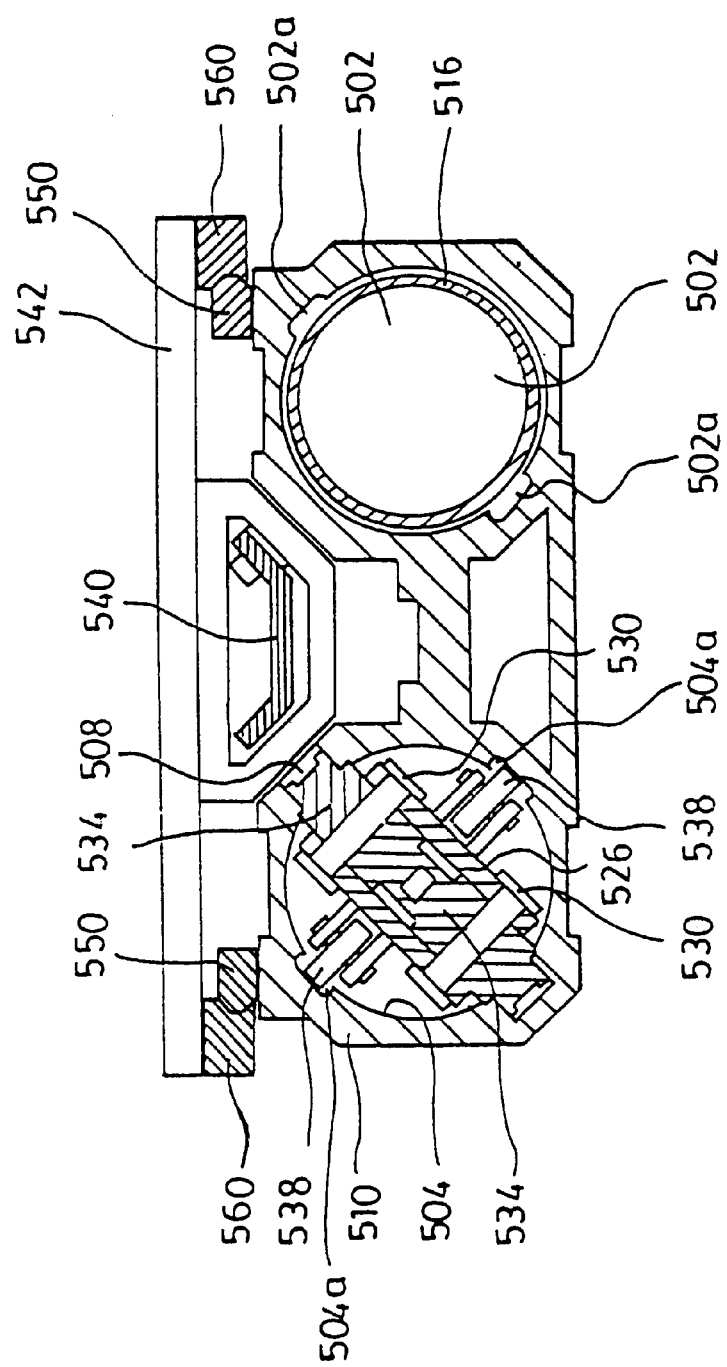
FIG. 15 is a cross-sectioned view of the actuator according to the fourth embodiment taken along the line F—F of FIG. 14.
Figure 16:
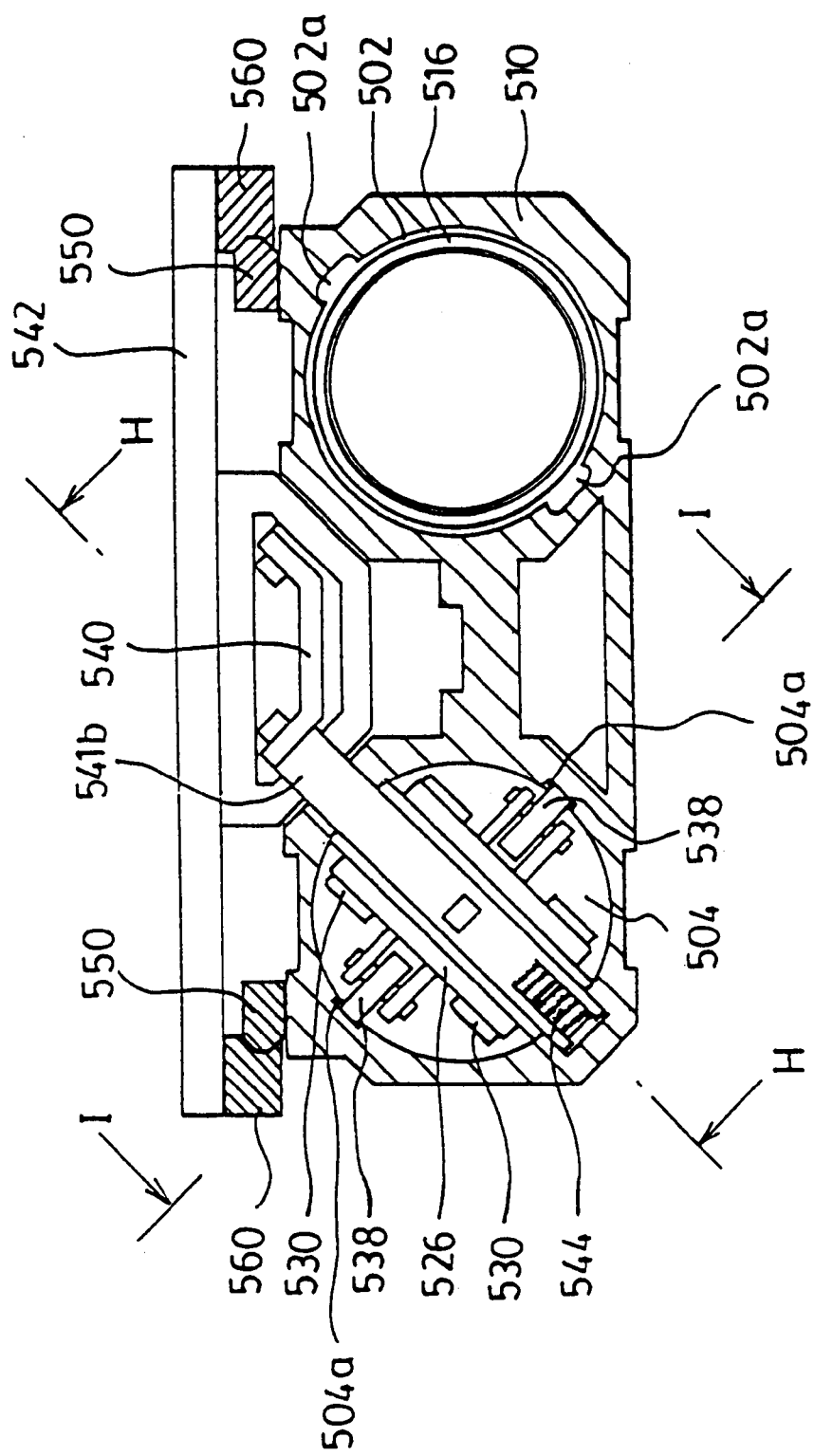
FIG. 16 is a cross-sectioned view of the actuator according to the fourth embodiment taken along the line G—G of FIG. 14.

FIG. 12 shows the slidable structure for the slide table 330 of the third embodiment. As shown in the drawing, two longitudinal guide members 342 and 442 are mounted along both side edges on the lower surface of the table 330. Two guide rails 344 and 444 are formed on the top wall of the housing 300 so as to movably engage with the two guide members 342 and 442, and so the table 330 is longitudinally and horizontally movable on the top wall of the housing 300.

The rodless cylinder actuator of the third embodiment yields the same operational effect as that expected from the primary embodiment and further explanation is thus not deemed necessary.

FIGS. 14 to 19 show a rodless cylinder actuator in accordance with the fourth embodiment of this invention. As shown in the drawings, the actuator of the fourth embodiment comprises a cylinder housing 510 having two longitudinal parallel openings 502 and 504, with two longitudinal slits 504 and 506 being formed along the sidewall of the housing 510 so as to respectively communicate with the openings 502 and 504. First and second cylinders 516 and 518 are installed within the two openings 502 and 504 in opposite directions. Two piston rods 512 and 514 are axially and movably positioned within the two cylinders 516 and 518. First and second covers 520 and 522 firmly support the bases of the two cylinders 516 and 518 and cover the longitudinal openings 502 and 504 of the housing 510. First and second brackets 524 and 526 are mounted to the outside ends of the two piston rods 512 and 514, respectively. A pulley set, consisting of two pulleys 532 or 534, is rotatably mounted to each bracket 524 or 526 using two shafts 528 or 530. First and second bearings 536 and 538 are provided at both sides of the two brackets 524 and 526 for preventing the piston rods 512 and 514 from being rotated. Two guide rails 550 are longitudinally and parallely formed along both side edges on the top wall of the housing 510. A slide table 542 for workpieces is slidably seated on the two guide rails 550, thus being linearly movable on the top wall of the housing 510. A belt 544, consisting of two belt parts, is fixed to the first and second covers 520 and 522 at the first ends of the two belt parts and is fixed to both sides of the table 542 at the second ends of the two belt parts. The above belt 544 also pass over the two pulley sets 532 and 534, thus moving the table 542 on the top wall of the housing 510 in accordance with a movement of the two piston rods 512 and 514 relative to the cylinders 516 and 518. First and second tension control units 570 and 580 are respectively installed on the two covers 520 and 522, and are used for controlling the tension of the belt 544 when necessary. The rodless cylinder actuator also has a connection member 540, which extends between the two brackets 524 and 526 so as to maintain a desired interval between the two pulley sets 532 and 534.

Two longitudinal guide grooves 502a or 504a are formed along the internal surface of each opening 502 or 504 at diametrically opposite positions. The above guide grooves 502a or 504a guide the two bearings 536 or 538 provided at both sides of each bracket 524 or 526.

Two longitudinal guide members 560 are mounted along both side edges on the lower surface of the table 542. The two guide members 560 externally and movably engage with the two guide rails 550 of the housing 510, respectively, thus allowing the table 542 to be longitudinally and horizontally movable on the top wall of the housing 510. Each of the two tension control units 570 and 580 comprises a belt support member 572 or 582 that supports the ends of the two belt parts. In such a case, the ends of the two belt parts are locked to the support members 572 and 582 using two belt locking members 574 and 584 the units 570 and 580 are also provided with first and second tension control screws 576 and 586, respectively, for controlling the tension of the two parts of the belt 544 when necessary. In the two units 570 and 580, the first ends of the screws 576 and 586 are connected to the first and second support members 572 and 582. The second ends of the two screws 576 and 586 are respectively threaded into the first and second covers 520 and 522 prior to being tightened by nuts at the outside of the covers 520 and 522 in a way such that each of the two screws 576 and 586 is rotatable relative to an associated cover 520 or 522 in opposite directions.

The rodless cylinder actuator according to the fourth embodiment will be assembled as follows.

The two cylinders 516 and 518, individually having one piston rod 512 or 514, are primarily inserted into the longitudinal openings 502 and 504 of the housing 510, respectively. Thereafter, the two parts of the belt 544 are connected to the two tension control units 570 and 580 at their first ends.

That is, after the two parts of the belt 544 are arranged to pass through the openings 502, 504 and the slits 506, 508, the two belt parts are fixed to the tension control screws 576 and 578 of the units 570 and 580 at their first ends. Thereafter, the two belt parts respectively pass over the two pulley sets 532 and 534 prior to being commonly fixed to the table 542 at their second ends.

The slide table 542 is seated on the top wall of the housing 510, with the guide members 560 of the table 542 externally and movably engaging with the guide rails 550 of the housing 510. In such a case, the guide members 560 engage with the guide rails 550 before the rails 550 are fixed to the top wall of the housing 510. Thereafter, both ends of the housing 510 are closed by the first and second covers 520 and 522. The two brackets 524 and 526 for the pulley sets 532 and 534 are connected to each other by the connection member 540.

In such a case, the two parts of the belt 544 are exposed outside the top wall of the housing 510 through the two longitudinal slits 506 and 508.

Of course, it should be understood that the order of assembling of the actuator may be somewhat freely changed from the above-mentioned order when necessary without affecting the functioning of this invention.

The above rodless cylinder actuator will be operated as follows.

When pressurized oil or pressurized air is newly introduced into the first cylinder 516 through the port A, with the existing pressurized oil or pressurized air being discharged from the second cylinder 518 through the port B, the piston rod 512 of FIG. 18 is moved to the right within the first cylinder 516, with the piston rod 514 of FIG. 19 being moved to the left within the second cylinder 518, thus moving the belt 544. In such a case, the two pulleys of the first pulley set 532 are rotated counterclockwise around their shafts 528 in FIG. 18, while the two pulleys of the second pulley set 534 are rotated clockwise around their shafts 530 in FIG. 19. The slide table 542 is thus moved to the right in FIG. 18.

When it is necessary to move the table 542 from the right-end position of FIG. 18 to the left-end position, pressurized oil or pressurized air is newly introduced into the second cylinder 518 through the port B, while the existing pressurized oil or pressurized air is discharged from the first cylinder 516 through the port A. In such a case, the piston rod 514 of FIG. 19 is extended to be moved to the left within the second cylinder 518, while the piston rod 512 of FIG. 18 is retracted to be moved to the left within the first cylinder 516.

As the belt 544 is moved as described above, the two pulleys of the second pulley set 534 are rotated counterclockwise around their shafts 530, while the two pulleys of the first pulley set 532 are rotated clockwise around their shafts 528. The slide table 542 is thus moved to the left in FIG. 18.

In the rodless cylinder actuator of the fourth embodiment, the two brackets 524 and 526 for the pulley sets 532 and 534 are connected to each other by the connection member 540. In such a case, the connection member 540 is mounted to two connectors 541a and 541b, provided at both brackets 524 and 526, at both ends thereof, thus maintaining a desired interval between the two brackets 524 and 526. Due to the connection members 540, it is possible to prevent an unexpected separation of the belt 544 from the pulley sets 532 and 534 even when existing pressurized oil or air is discharged from the first or second cylinder 516 or 518 through the port A or B. This finally allows the rodless cylinder actuator to be almost completely free from safety hazards during an operation. The above connection member 540 is a plate member capable of preventing the belt 544 from coming into contact with peripheral elements during a slidable movement of the piston rods 512 and 514. That is, the connection member 540 is collaterally used as a cover. The connection member 540 thus effectively protects the belt 544 and the peripheral elements.

In the fourth embodiment, the two longitudinal guide grooves 502a or 504a are formed along the internal surface of each opening 502 or 504 of the housing 510 at diametrically opposite positions. The above guide grooves 502a or 504a guide the two bearings 536 or 538, provided at both sides of each bracket 524 or 526. Therefore, the piston rods 512 and 514 are not undesirably, rotated within the cylinders 516 and 518 during an operation of the actuator.

Figure 20:
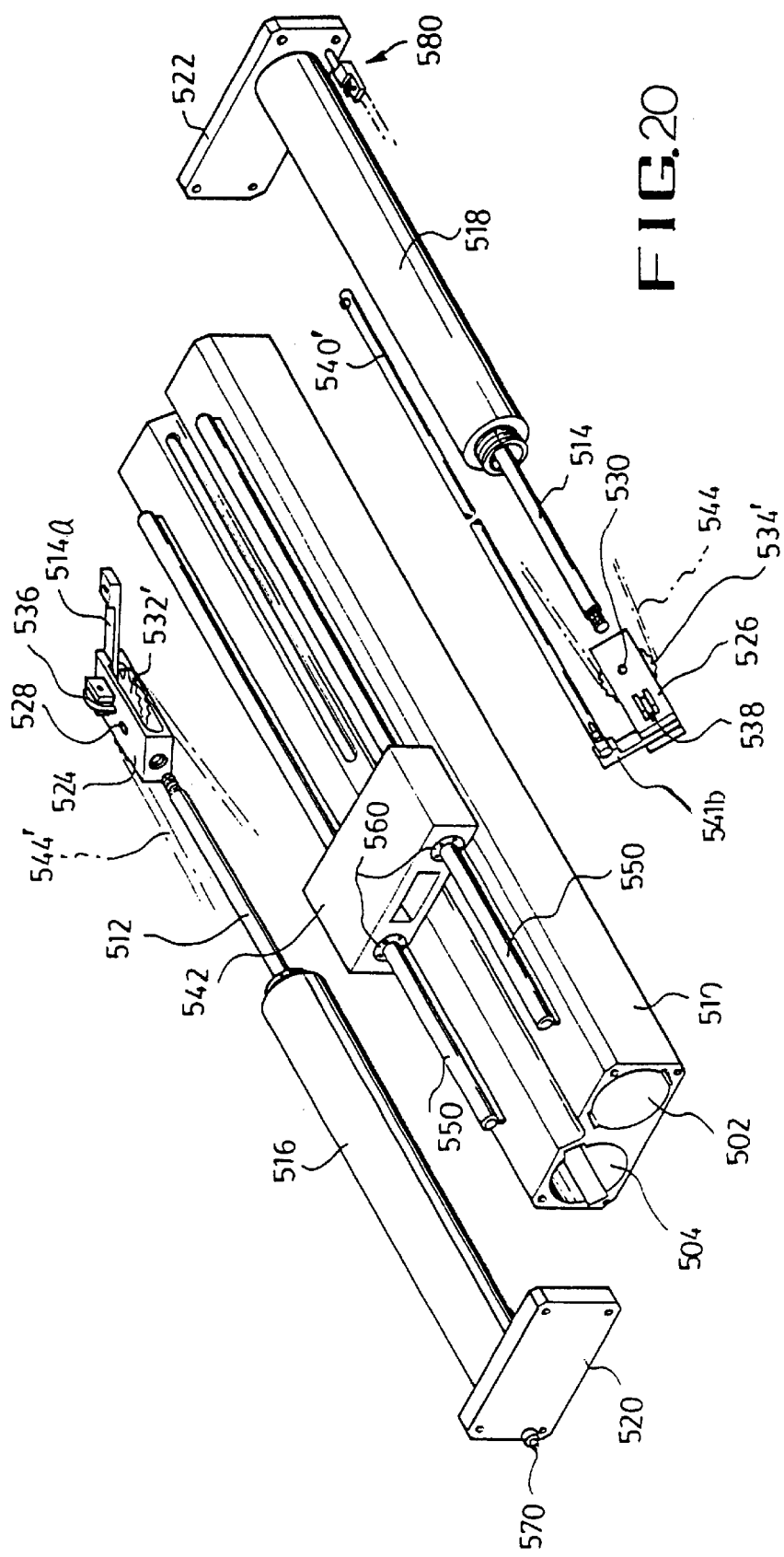
FIG. 20 is an exploded perspective view of a rodless cylinder actuator according to the fifth embodiment of the present invention, with a cylinder housing being removed for ease of description.

FIG. 20 is an exploded perspective view of a rodless cylinder actuator according to the fifth embodiment of this invention, with a cylinder housing being removed for ease of description.

In the fifth embodiment, the general shape of the actuator remains the same as in the fourth embodiment of FIGS. 14 to 19, but a sprocket 532' or 534' is installed within each of the two brackets 524 and 526, with both a connection rod 540' and a chain 544' being substituted for the connection member 540 and the belt 544.

The rodless cylinder actuator of the fifth embodiment yields the same operational effect as that expected from the fourth embodiment and further explanation is thus not deemed necessary.

As described above, the present invention provides a rodless cylinder actuator for moving a slide table used for feeding workpieces in machine tools. In the rodless cylinder actuator of this invention, two pneumatic or hydraulic cylinders are parallely arranged to be directed in opposite directions. At least one pulley is rotatably mounted to the outside end of the piston rod of each cylinder using a bracket. A belt is fixed to the cover of a cylinder housing at both ends thereof and passes over the pulleys of the two piston rods. The slide table is mounted on the middle portion of the belt, thus being linearly and longitudinally reciprocable on the top surface of the cylinder housing in accordance with a movement of the piston rods relative to the two cylinders. A connection member extends between the brackets of the two piston rods, thus maintaining the desired interval between the two brackets. The rodless cylinder actuator has a simple construction capable of reducing the production cost of the actuators. Due to such a simple construction, the rodless cylinder actuator of this invention is rarely broken, and, if need be, is easily repaired in the case of an unexpected breakage. This finally reduces the repairing and maintenance cost of the rodless cylinder actuator. Another advantage of the rodless cylinder actuator of this invention resides in that it rarely causes safety hazards during an operation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A rodless cylinder actuator for moving slide tables, comprising:

a cylinder housing;

two cylinders provided within said cylinder housing;

two piston rods axially and movably received in the two cylinders, respectively;

at least one pulley rotatably shafted to an outside end of each of the two piston rods using a bracket;

a wire consisting of two wire parts, said two wire parts being fixed to first and second wire locking members of the cylinder housing at their first ends and respectively passing over the pulleys of the two piston rods;

a slide table mounted to a junction of the two wire parts and positioned outside a top wall of said cylinder housing to be movable on the top wall of the housing in accordance with a movement of said two piston rods relative to the two cylinders; and two tension control units for respectively controlling the tension of said wire when necessary, said tension control units being provided on said slide table and being respectively connected to second ends of said two wire parts.

2. The rodless cylinder actuator according to claim 1, wherein a connection rod extends between the two brackets of the piston rods so as to maintain a desired interval between the pulleys of the brackets.

3. The rodless cylinder actuator according to claim 1, wherein each of the two tension control units comprises:

a unit housing provided with a recess;

a wire locking member movably set in said recess and used for locking the second end of an associated wire part to the unit housing; and a tension control screw engaging with the wire locking member and being operated to move said wire locking member within the recess in either direction, thus controlling the tension of the associated wire part.

4. A rodless cylinder actuator for moving slide tables, comprising:

a cylinder housing having two longitudinal parallel openings, with two longitudinal slits being formed along the sidewall of said housing so as to respectively communicate with the two parallel openings;

two cylinders installed within said two openings of the housing in opposite directions, with two piston rods being axially and movably positioned within the two cylinders, respectively;

two covers respectively and firmly supporting the bases of the two cylinders and covering the two longitudinal openings of the housing;

two brackets mounted to the outside ends of the piston rods, respectively;

at least one pulley rotatably shafted to each of the two brackets;

two bearings provided at both sides of each of the two brackets for preventing each piston rod from being rotated within an associated cylinder;

a slide table movably seated on two guide rails longitudinally and parallely extending along both side edges on the top wall of said cylinder housing, said table thus being linearly movable on the top wall of said housing;

a belt consisting of two belt parts, said two belt parts being respectively fixed to the two covers of the two cylinders at first ends thereof and being fixed to both side ends of said slide table at second ends thereof, said two belt parts also respectively passing over the pulleys of the two piston rods, thus moving the table on the top wall of said housing in accordance with a movement of the two piston rods relative to the cylinders;

two tension control units respectively installed on said two covers and used for controlling the tension of said two belt parts when necessary; and a connection member extending between the two brackets of the piston rods so as to maintain a desired interval between the pulleys of the two brackets.

5. The rodless cylinder actuator according to claim 4, wherein two longitudinal guide members are mounted along both side edges on the lower surface of said slide table, said guide members externally and movably engaging with the two guide rails of the cylinder housing, respectively.

6. The rodless cylinder actuator according to claim 4, wherein each of said two tension control units comprises:

a belt support member supporting the second end of an associated one of the two belt parts;

a belt locking member used for locking the second end of the associated belt part to said belt support member; and a tension control screw used for controlling the tension of the associated belt part, said screw being connected to the belt support member at its first end and being threaded into an associated one of the two covers at its second end so as to be rotatable relative to the associated cover in opposite directions.

7. The rodless cylinder actuator according to claim 4, wherein two longitudinal guide grooves are formed along the internal surface of each of the two longitudinal openings at diametrically opposite positions and guide the two bearings provided at both sides of each of the two brackets.

* * * * *